(12) United States Patent
Nakagawa

(10) Patent No.: US 9,250,959 B2
(45) Date of Patent: Feb. 2, 2016

(54) RECORDING MEDIUM VIRTUAL NETWORK CONTROL METHOD AND INFORMATION PROCESSING APPARATUS FOR VIRTUAL NETWORK CONTROL

(75) Inventor: Yukihiro Nakagawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 315 days.

(21) Appl. No.: 13/544,317

(22) Filed: Jul. 9, 2012

(65) Prior Publication Data

US 2012/0278807 A1 Nov. 1, 2012

Related U.S. Application Data

(63) Continuation of application No. PCT/JP2011/050672, filed on Jan. 17, 2011.

(30) Foreign Application Priority Data

Jan. 18, 2010 (JP) ................................. 2010-008504

(51) Int. Cl.
| | |
|---|---|
| *G06F 9/455* | (2006.01) |
| *G06F 9/46* | (2006.01) |
| *H04L 12/28* | (2006.01) |
| *G06F 9/48* | (2006.01) |
| *H04L 12/801* | (2013.01) |
| *H04L 12/701* | (2013.01) |

(52) U.S. Cl.
CPC .............. *G06F 9/4856* (2013.01); *G06F 9/455* (2013.01); *G06F 2009/4557* (2013.01); *G06F 2009/45575* (2013.01); *H04L 45/00* (2013.01); *H04L 47/10* (2013.01)

(58) Field of Classification Search
None
See application file for complete search history.

(56) References Cited

U.S. PATENT DOCUMENTS

| | | | |
|---|---|---|---|
| 8,619,771 B2 * | 12/2013 | Lambeth et al. .............. 370/389 |
| 2005/0182853 A1 | 8/2005 | Lewites et al. |
| 2006/0195715 A1 | 8/2006 | Herington |
| 2009/0077552 A1 | 3/2009 | Sekiguchi et al. |
| 2009/0185571 A1* | 7/2009 | Tallet ............................ 370/401 |
| 2009/0198862 A1 | 8/2009 | Okitsu et al. |
| 2009/0240790 A1 | 9/2009 | Utsunomiya et al. |

FOREIGN PATENT DOCUMENTS

| | | |
|---|---|---|
| JP | 2006-244481 | 9/2006 |
| JP | 2007-522583 | 8/2007 |

(Continued)

OTHER PUBLICATIONS

International Search Report dated Apr. 19, 2011, issued in corresponding PCT Patent Application No. PCT/JP2011/050672.

*Primary Examiner* — Meng An
*Assistant Examiner* — Bing Zhao
(74) *Attorney, Agent, or Firm* — Staas & Halsey LLP

(57) ABSTRACT

A virtual network control program includes allowing a physical port of a destination server device, which is a destination of a virtual machine to be transferred by migration, to use a virtual network used by the virtual machine to be transferred when the physical port of the destination server device does not belong to the virtual network; determining whether or not the virtual network, which has been used by the virtual machine in a source server device, is used by another virtual machine running on the source server device when the virtual machine to be transferred has been transferred onto the destination server device; and inhibiting, when it is determined that the another virtual machine does not use the virtual network, that a physical port of the source server device uses the virtual network which has been used by the virtual machine to be transferred.

6 Claims, 19 Drawing Sheets

(56) References Cited

FOREIGN PATENT DOCUMENTS

| | | |
|---|---|---|
| JP | 2009-70142 | 4/2009 |
| JP | 2009-181418 | 8/2009 |
| JP | 2009-217302 | 9/2009 |
| JP | 2009-232207 | 10/2009 |
| WO | 2005/083946 | 9/2005 |

* cited by examiner

FIG.5

| MAC ADDRESS | VLAN ID | PORT NUMBER |
|---|---|---|
| X | V1 | P3 |
| Y | V1 | P1 |
| ... | ... | ... |

FIG.6

| VLAN ID | BELONGING PORT NUMBER |
|---|---|
| V1 | P1, P2, P3, P4 |
| ... | ... |

FIG.11

VLAN SETTING (BEFORE TRANSFER)
V1 (SOLID LINE): P1, P2, P3
V2 (DOTTED LINE): P1, P2, P3

FIG.12

VLAN SETTING (AFTER MIGRATION)
V1 (SOLID LINE): P1, P3
V2 (DOTTED LINE): P2, P3

FIG.16

VLAN SETTING (BEFORE TRANSFER)
V1 (SOLID LINE): P1, P3
V2 (DOTTED LINE): P2, P3

FIG.17

VLAN SETTING (AFTER TRANSFER)
V1 (SOLID LINE): P1, P2, P3
V2 (DOTTED LINE): P1, P2, P3

FIG.19

VLAN SETTING (BEFORE TRANSFER)
V1 (SOLID LINE): P1, P2, P3
V2 (DOTTED LINE): P1, P2, P3

FIG.20

VLAN SETTING (AFTER TRANSFER)
V1 (SOLID LINE): P1, P2, P3
V2 (DOTTED LINE): P1, P2, P3

Related Art

Related Art

RECORDING MEDIUM VIRTUAL NETWORK CONTROL METHOD AND INFORMATION PROCESSING APPARATUS FOR VIRTUAL NETWORK CONTROL

CROSS-REFERENCE TO RELATED APPLICATION

This application is a continuation application of International Application PCT/JP2011/050672 filed on Jan. 17, 2011 and designates U.S., the entire contents of which are incorporated herein by reference. This application is based upon and claims the benefit of priority of the prior Japanese Patent Application No. 2010-008504, filed on Jan. 18, 2010; the entire contents of which are incorporated herein by reference.

FIELD

The present invention relates to a virtual network control program, a virtual network control method, and an information processing apparatus.

BACKGROUND

Heretofore, there has been known a server virtualization technology in which a plurality of virtual servers so called as VMs (Virtual Machines) are running on a server serving as an information processing apparatus. On the server, a VMM (Virtual Machine Monitor) for executing various controls relating to the VMs, such as the creation of VMs, are running.

The above-mentioned server virtualization technology carries out live migration for transferring a VM which is running in a certain server onto another server without stopping the operation of the VM. Explanation will be made of an example of the process of this live migration with reference to FIGS. 22 and 23. FIG. 22 is a view illustrating the configuration of a system for carrying out the live migration, and FIG. 23 is a view illustrating an operation sequence of the live migration.

As depicted in FIG. 22, the above-mentioned example to be explained is such that a VM on server A which is a source server is transferred into server B which is a destination server. Further, VMMs for executing various controls relating to the VMs are running respectively on serves A and B. In this situation, as depicted in FIG. 23, the VMM which is running on server B as a destination server creates a new VM on server B in response to a command manipulation by the administrator.

Then, as depicted in FIG. 23, the VMM which is running on server A as a source server, executes pre-copy in the condition that the VM to be transferred is running in server A. Specifically, the VMM which is running on server A, transfers the content of a memory used by itself into the VMM on server B, and the VMM on server A repeats the pre-copy in accordance with a change amount in memory.

Thereafter, as depicted in FIG. 23, the VMM on server A executes stop-and-copy when the change amount in memory becomes not greater than a predetermined value. Specifically, the VMM in server A temporarily stops the work of the VM to be transferred, and transfers the content of the memory used by itself, into the VMM on server B.

Further, as depicted in FIG. 23, the VMM in server B initiates the VMM which has been transferred, in order to restart the work, and as well, transmits a reverse APP (Address Resolution Protocol) to a physical switch. Then, the VMM on server B notifies the fact that a MAC address (Media Access Control address) and an IP (Internet Protocol) address are transmitted to server B. By carrying out the live migration as described above, the VM may be transferred.

Patent Literature 1: Japanese Laid-open Patent Publication No. 2009-181418

Patent Literature 2: Japanese Laid-open Patent Publication No. 2009-217302

However, the prior art has raised a problem that an unnecessary traffic may possibly be generated when the migration is carried out.

For example, as depicted in the left side part of FIG. 24, an assumption is made such that a VM1 on a server A and a VM3 on a server B are connected together by a VLAN(A) which is one and the same VLAN (Virtual Local Area Network), and a VM2 on the server A and a VM4 on the server B are connected together by one and the same VLAN(B). In this case, the live migration is carried out for the VM2 from the server A onto the server B and for the VM3 from the server B onto the server A. The VLAN setting of external switches which constitute a network is executed, in the live-migration so that the server as a destination server also belongs to the VLAN. Accordingly, as depicted in the right side portion of FIG. 24, there is caused the condition that the VLANs the transferred VMs have used still remain on the respective servers, resulting in the generation of unnecessary traffics. FIG. 24 is a view illustrating a result of the live migration relating to the prior art.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

SUMMARY

According to an aspect of an embodiment of the invention, a non-transitory computer-readable recording medium having stored therein a program for causing a computer to execute a virtual network control process comprising: allowing a physical port of a destination server device, which is a destination of a virtual machine to be transferred by migration, to use a virtual network used by the virtual machine to be transferred when the physical port of the destination server device does not belong to the virtual network; determining whether or not the virtual network, which has been used by the virtual machine in a source server device, is used by another virtual machine running on the source server device when the virtual machine to be transferred has been transferred onto the destination server device; and inhibiting, when it is determined that the another virtual machine does not use the virtual network, that a physical port of the source server device uses the virtual network which has been used by the virtual machine to be transferred.

BRIEF DESCRIPTION OF DRAWINGS

FIG. 5 is a view illustrating an example of data stored in a MAC table.

FIG. 6 is a view illustrating an example of data stored in a VLAN table.

FIG. 11 is a view illustrating VLAN setting information in the current situation in which the migration is started.

FIG. 12 is a view illustrating VLAN setting information which is stored as a scheduled set, after completion of the migration.

FIG. 16 is a view illustrating VLAN setting information in the current situation in which the migration is started.

FIG. 17 is a view illustrating VLAN setting information which is stored as scheduled set, after completion of the migration.

FIG. 19 is a view illustrating VLAN setting information in the current situation in which the migration is started.

FIG. 20 is a view illustrating VLAN setting information stored as a scheduled set, after completion of the migration.

DESCRIPTION OF EMBODIMENTS

Detailed explanation will be made of embodiments of a virtual network control program, a virtual network control method and an information processing apparatus which are disclosed by the present invention, with reference to the accompanying drawings. It is noted that the present invention is not limited to these embodiments.

[a] First Embodiment

Entire Configuration

Figure 1:
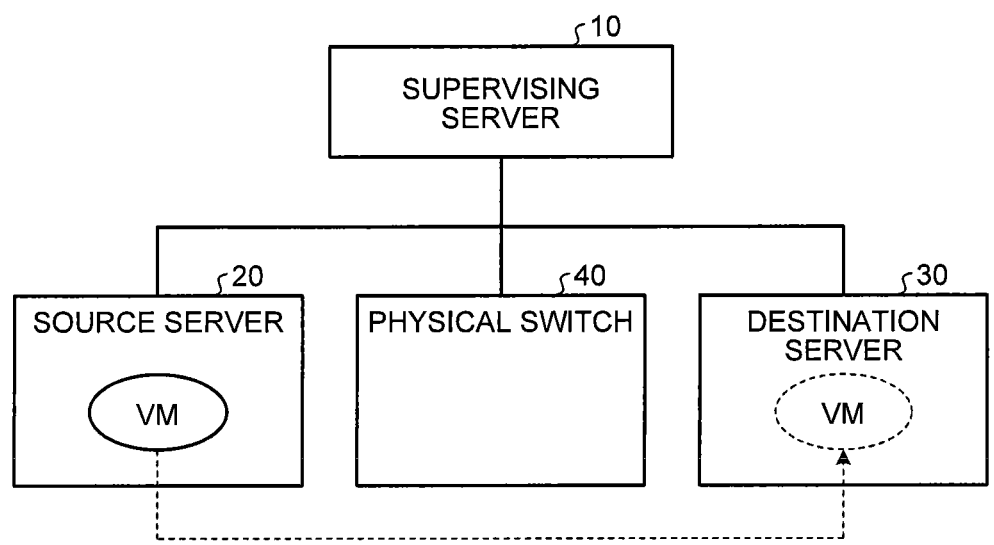
FIG. 1 is a view illustrating the entire configuration of a system according to First Embodiment.

First, explanation will be made of the entire configuration of a system including a supervising server, that is disclosed by the present invention, with reference to FIG. 1. FIG. 1 is a view illustrating the entire configuration of the system according to First Embodiment. As illustrated in FIG. 1, the system has a supervising server 10, a source server 20, a destination server 30 and a physical switch 40.

The supervising server 10 serves as an information processing apparatus for supervising and controlling information relating to a VM (virtual machine) when the live-migration of this VM is carried out between servers. For example, the supervising server 10 determines whether or not the physical port of the destination server 30 onto which the VM is to be transferred by the live-migration belongs to a VLAN (virtual Local Area Network) which is used by the VM to be transferred.

If the physical port of the destination server 30 does not belong to the VLAN which is used by the VM to be transferred, the supervising server 10 executes such control that the physical port of the destination server 30 can use the VLAN. Thereafter, the supervising server 10 determines whether or not the VLAN the VM to be transferred has used is used by another VM on the source server 20 when the VM to be transferred due to the live-migration has been transferred onto the destination server 30. Then, if determination is made such that it is not used by another server on the source server 20, the supervising server 10 executes the control that the physical port of the source server does not use the VLAN which has been used by the VM to be transferred.

The source server 20 serves as an information processing apparatus on the source side from which the VM is transferred onto the destination server 30 by the live-migration. As illustrated in the figure, it is noted that only one VM is initiated on the source server 20, but the present invention is not limited to this figure, that is, a plurality of VMs may be initiated.

The destination server 30 serves as an information processing apparatus onto which the VM is transferred from the source server 20 by the live-migration. As illustrated in the figure, it is noted that only one VM is initiated on the destination server 30, but the present invention is not limited to this figure, that is, a plurality of VMs may be initiated on the destination server 30.

The physical switch 40 is a network equipment such as a switch which performs routing control for data transfer between servers. For example, the physical switch 40 holds therein routing information between servers or routing information among VMs which are running on these servers, and executes the routing control with the use of such information.

Configurations of Component Devices

Next, explanation will be made of the configurations of respective component devices depicted in FIG. 1. Thus, the supervising server 10, the source server 20 and the physical switch 40 will be explained below in the mentioned order. It is noted that the source server 20 and the destination server 30 have the same configuration, and accordingly, detailed explanation will be made of the source server 20 alone.

Configuration of Supervising Server

Figure 2:
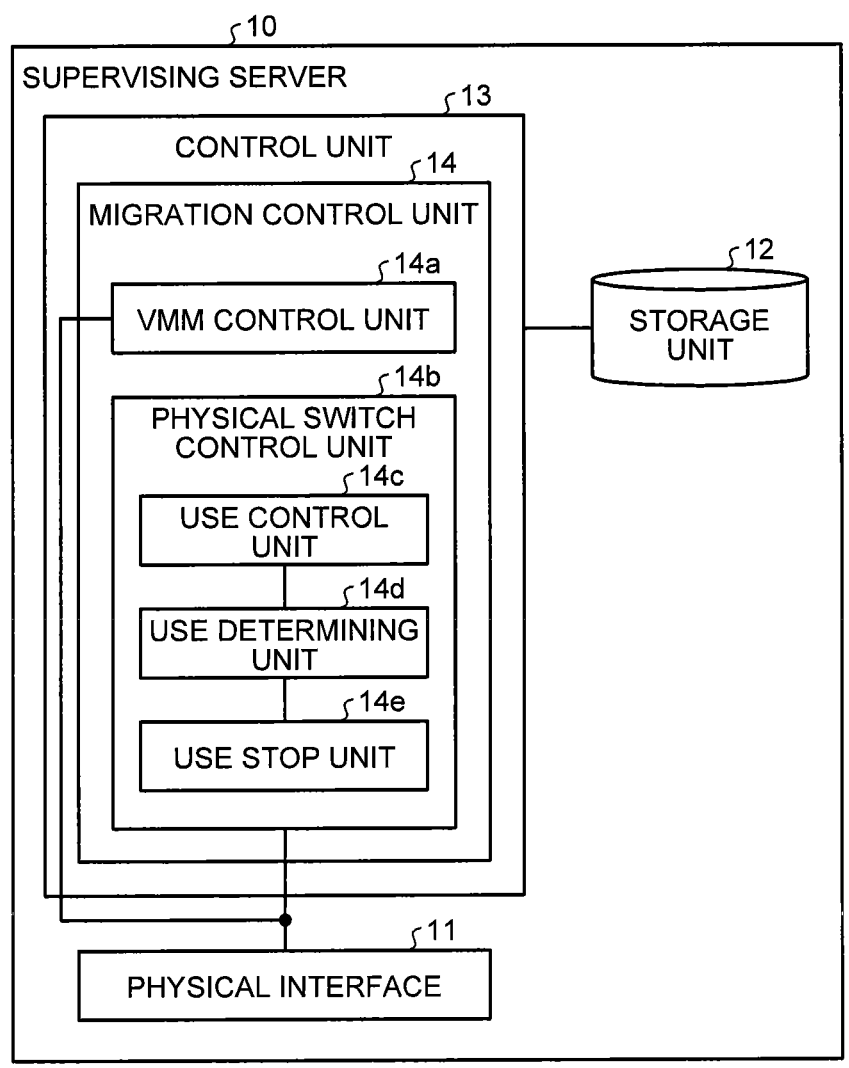
FIG. 2 is a block diagram illustrating the configuration of a supervising server.

FIG. 2 is a block diagram illustrating the configuration of the supervising server. As illustrated in FIG. 2, the supervising server 10 includes a physical interface 11, a storage unit 12 and a control unit 13. In addition to these components, it may include an input unit such as a mouse for receiving instructions from an administrator or the like, and a display unit such as a display panel for indicating a result of the migration.

The physical interface 11 is a network interface card (NIC: Network Interface Card) for controlling the communication to and from other servers or the physical switch 40. For example, the physical interface 11 transfers a VM creating instruction and a VM initializing instruction for the destination server 30, which has been transmitted from the control unit 13 (will be described later), and receives responses thereto. The physical interface 11 also transfers instructions which have been transmitted from the control unit 13 to the physical switch 40 to add the physical port of the destination server 30 to the VLAN and an instruction to delete the physical port of the source server 20 from the VLAN which has been used by the VM to be transferred.

The storage unit 12 is a memory unit such as a semiconductor memory device or a hard disk, for storing data and programs which is used for various processes executed by the control unit 13. The control unit 13 is an electronic circuit such as a CPU (Central Processing Unit) or an MPU (Micro Processing Unit). This control unit 13 has an internal memory which stores therein, control programs such as an OS (Operating System), programs defining various process steps and data, and a migration control unit 14 in order to execute several processes with the use of these components.

The migration control unit 14 has a VMM (Virtual Machine Monitor) control unit 14a and a physical switch control unit 14b, and controls the migration carried out between servers, with the use of these components.

The VMM control unit 14a executes various controls for VMMs on the source server 20 and the destination server 30. For example, the VMM control unit 14a receives migration information which is instructed by the administrator or the like, and which indicates that any one of the VMMs on a server is transferred into a desired place, by way of an input unit such as a mouse. Further, the VMM control unit 14a transmits the VM creating instruction to the VMM on the destination server 30 onto which the VM is to be transferred in accordance with the received migration information. Further, the VMM control unit 14a transmits an instruction to initiate the new transferred VM, to the VMM on the destination server 30 after the execution of the migration is completed.

It is noted here that explanation has been made of the example in which the migration information and the start instruction are received from the administrator or the like, but the present invention is not limited to this example. For example, the start instruction and the migration information may be registered beforehand and subjected to scheduling with which the control process can be carried out.

The physical switch control unit 14b includes a use control unit 14c, a use determining unit 14d and a use stop unit 14e, and controls, with the use of these components, the VLAN configuration on the source server 20 and the VLAN configuration on the destination server 30 with respect to the VM due to the migration. If the physical port of the destination server 30 onto which the VM is to be transferred due to the migration, does not belong to the VLAN which is to be used by VM to be transferred, the use control unit 14c adds the physical port of the destination server 30 to this VLAN.

The use determining unit 14d determines whether or not the VLAN which has been used by the VM to be transferred due to the migration is used by any another VM on the source server 20 when the VM to be transferred by the migration has been transferred. The use stop unit 14e deletes the physical port of the source server 20 from the VLAN which has been used by the VM to be transferred if the use determining unit 14d determines that the VLAN is not used by any other VM on the source server 20.

As a specific example, it is assumed that the source server is connected to the physical switch via a physical port (P1), and executes a VM1 which uses a VLAN(V1) and a VM2 which uses a VLAN(V2). It is also assumed that the destination server is connected to the physical switch via a physic port (P2), and executes a VM3 which uses the VLAN (V1) and a VM4 which uses the VLAN (V2). In this condition, an assumption is made such that "the VMM control unit 14a accepts "the VM1, the source server 20, the destination server 30 and the V1" as "VM to be transferred, the source server, the destination server and the belonging VLAN". That is, explanation will be made of the example that the VM1 to be transferred, which belongs to VLAN=V1, is transferred onto the destination server 30.

In this case, the use control unit 14c refers to a VLAN table 43 or the like on the physical switch 40 so as to determine whether the physical port (P2) of the destination server 30 belongs to the VLAN (V1) or not. Further, if the physical port (P2) of the destination server 30 does not belong to the VLAN (V1), the use control unit 14c transmits to the physical switch 40 an instruction to add the physical port (P2) to a physical port list which belongs to "V1" stored on the VLAN table 43. It is noted that the use control unit 14c does not execute any process step if the physical port (P2) of the destination server 30 belongs to the VLAN (V1).

Further, the use determining unit 14d refers to the VLAN table 43 or the like on the physical switch 40 so as to determine whether any other VM initiated on the source server 20 from which the VM1 is transferred, belongs to the VLAN (V1) or not. In the above-mentioned example, the use determining unit 14d transmits the information indicating "unused" as a determination result, to the use stop unit 14e if any other VM on the source server 20 does not belong to the VLAN (V1). Meanwhile, if any other VM on the source server 20 belongs to the VLAN (V1), the use determining unit 14d transmits an information indicating "used" as a determination result, to the use stop unit 14e.

It is assumed that the use stop unit 14e receives information indicating "unused" from the use determining unit 14d, as a determination result. In this case, the use stop unit 14e transmits to the physical switch 40 an instruction to delete the physical port (P1) of the source server 20 from the physical port list which belongs to "V1" stored on the VLAN table 43.

Configuration of Source Server

Figure 3:
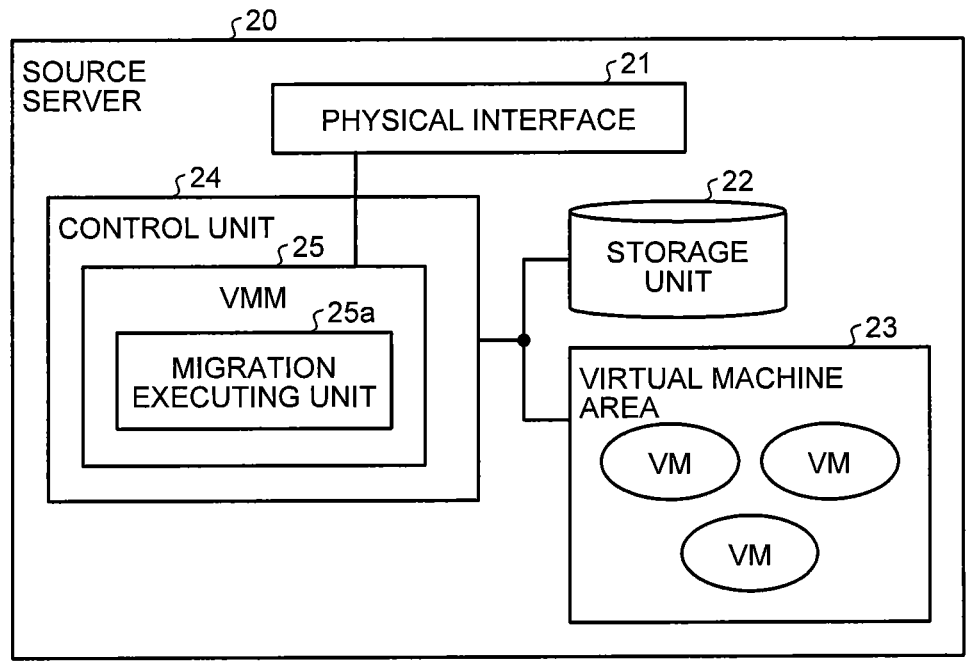
FIG. 3 is a block diagram illustrating the configuration of a source server.

FIG. 3 is a block diagram illustrating the configuration of the source server. As illustrated in FIG. 3, the source server 20 includes a physical interface 21, a storage unit 22, a virtual machine area 23 and a control unit 24. It is noted that the source server may have, in addition to these components, an input unit such as a mouse for receiving various instructions from the administrator or the like, and a display unit such as a display panel for displaying a result of the migration.

The physical interface 21 is an NIC for controlling the communication to and from another server or the physical switch 40. For example, the physical interface 21 receives a VM creating instruction, a VM initializing instruction, a migrating commencing instruction or the like from the supervising server 10. Further, the physical interface 21 transmits a VM creation completing response, a VM initialization completing response or a migration completing response or the like to the supervising server 10.

The storage unit 22 is a storage unit such as a semiconductor memory device or a hard disk, for storing data and programs used for various processes carried out by the control unit 24 which will be described later, and is adapted to store, for example, VM identification numbers, information relating to VM, such as belonging VLAN. The virtual machine area 23 is the area in which a plurality of VMs created by the control unit 24 are initiated, and an arbitrary number of VMs can be initiated.

The control unit 24 is an electronic circuit such as CPU or MPU. The control unit 24 has an internal memory for storing control programs such as an OS, programs for defining various process steps, and data, and also has a VMM 25 so as to execute various processes with the use of these components.

The VMM 25 is a software for executing various control relating to the VMs, such as creation, deletion, initiation or stop of the VMs, and has a migration executing unit 25a. For example, the VMM 25 creates a VM on the virtual machine area 23 when it receives a VM creating instruction from the supervising server 10, and deletes the associated VM from the virtual machine area 23 when it receives a VM deleting instruction from the supervising server 10. Further, the VMM 25 initiates the associated VM on the virtual machine area 23 when it receives a VM initializing instruction from the supervising server 10, and stops the associated VM in the virtual machine area 23 when it receives a VM stop instruction from the supervising server 10.

The migration executing unit 25*a* controls the execution of the migration. For example, the migration executing unit 25*a* executes the pre-copy of the associated VM when the VMM 25 receives a migration commencing instruction from the supervising server 10, and repeats the pre-copy in accordance with a change amount in memory. Further, the migration executing unit 25*a* executes stop-and-copy when the change amount in memory becomes not greater than a predetermined value. It is noted that the information such as that any one of VMs is transferred under migration to a certain place may be received from the supervising server 10, or may be subjected to scheduling by a task or the like.

Configuration of Physical Switch

Figure 4:
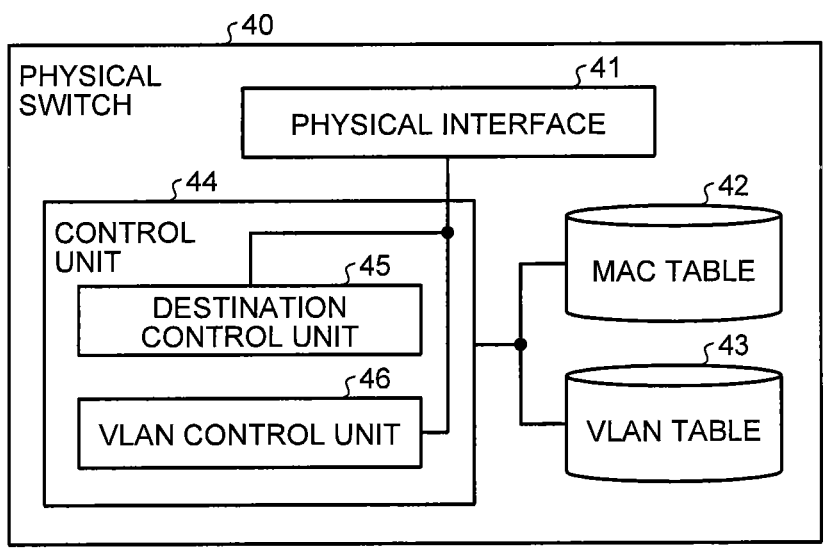
FIG. 4 is a block diagram illustrating the configuration of a physical switch.

FIG. 4 is a block diagram illustrating the configuration of the physical switch. As illustrated in FIG. 4, the physical switch 40 includes a physical interface 41, an MAC table 42, the VLAN table 43 and a control unit 44. It is noted that the physical switch may include an input unit such as a mouse capable of receiving various instructions from the administrator or the like, and a display unit such as a display unit for displaying a result of the migration, in addition to these components.

The physical interface 41 is an NIC for controlling the communication to and from each of the supervising server 10, the source server 20 and the destination server 30. For example, the physical interface 41 receives from the supervising server 10 the information that any one of VMs is added to any one of VLANs or the information that any one of VMs is deleted from any one of VLANs.

The MAC table 42 is a storage unit such as a semiconductor memory device or a hard disk, for dynamically learning and storing an MAC address (Media Access Control address), a VLAN and a port number on a server to be connected. For example, as depicted in FIG. 5, the MAC table 42 stores "X, V1, P3" and "Y, V1, P1" as "MAC address, VLAN ID and a port number". It is noted that FIG. 5 is a view illustrating an example of the information which is stored on the MAC table. Further, the information which is stored on the MAC table can be arbitrarily set and changed.

An "MAC address" stored on the MAC table, is the source MAC address included in data (packet) which are received via the physical interface 41. A "VLAN ID" is an identifier for identifying VLAN included in a packet which is received via the physical interface 41. A "Port number" is the port number of the physical interface 41 which has received the packet, that is, the port number of the source server, and with this port number, it can be recognized which port number is connected by the server.

The VLAN table 43 is a storage unit such as a semiconductor memory device or a hard disk, for storing a port number which belongs to the VLAN. For example, as illustrated in FIG. 6, the VLAN table 43 stores "V1, P1, P2, P3, P4" as "VLAN ID, port number of belonging server". The abovementioned information may be manually registered by the administrator of the like, and may be acquired automatically from a packet which is interchanged. It is noted that FIG. 6 is a view illustrating an example of information stored on the VLAN table. Further, the information stored on the VLAN table 43 may be set and changed arbitrarily.

The "VLAN ID" which is stored thereon is an identifier for identifying the VLAN included in the packet which is received via the physical interface 41. The "Port number" is the port number of a server which belongs to the VLAN ID. This information may be registered by the administrator or the like, or may be automatically acquired from a packet which is interchanged.

The control unit 44 is an electronic circuit such as a CPU or an MPU. The control unit 44 has an internal memory for storing control programs such as an OS, programs which define various process steps, and data, and as well, has a destination control unit 45 and a VLAN control unit 46 in order to execute various processes with these components.

The destination control unit 45 controls the routing of data which are interchanged among connected servers. For example, the destination control unit 45 refers to the MAC table 42 or the VLAN table 43 so as to specify a destination server or a VLAN to which the destination server belongs when data are received from a server such as the source server 20. Further, the destination control unit 45 transmits data to the port number or the VLAN, to which the specified server is connected.

Further, the destination control unit 45 learns the MAC table 42 from the received packet. For example, the destination control unit 45 receives a packet as to "destination=X, source=Y, VLAN=V1" from the port number (P1), and floods the packet which is received to all port numbers that belong to the VLAN (V1) if this packet is not yet learned. Further, the destination control unit 45 stores "MAC address=Y, VLAN ID=V1, Port Number=P1" in the MAC table 42. Thereafter, the destination control unit 45 stores "MAC address=X, VLAN ID=V1, Port Number=P3" in the MAC table 42 when the packet as to "Destination=Y, Source=X, VLAN=V1", is received from the port number (P3). Thus, the destination control unit 45 learns the MAC table 42 from the received packet.

The VLAN control unit 46 executes various controls relating to the VLAN, such as creation or deletion of the VLAN. For example, it is assumed that the VLAN control unit 46 receives an instruction to create a new VLAN and a port number list which belongs to this VLAN, from the administrator or the like. In this case, the VLAN control unit 46 creates this VLAN, and stores the VLAN ID of this VLAN and the received port number list in the VLAN table 43 after they are caused to correspond to each other. Further, the VLAN control unit 46 deletes data corresponding to the VLAN ID of a VLAN when an instruction to delete the VLAN is received from the administrator or the like.

Further, when an instruction to register a new port number to the VLAN which has already existed, is received, the VLAN control unit 46 registers the received port number corresponding to the VLAN ID on the port number list stored in the VLAN table 43. For example, if an instruction to add the port number "P2" of the destination server 30 to the VLAN (V1) is received, the VLAN control unit 46 adds "P2" to the port number list which belongs to the VLAN (V1) in the VLAN table 43.

Further, when an instruction to delete a port number which belongs to the VLAN that has been already existed, is received, the VLAN control unit 46 deletes the thus instructed port number from the port number list which is stored in the VLAN table 43, corresponding to the VLAN ID of this VLAN. For example, the VLAN control unit 46 deletes "P1" from the port number list which belongs to the VLAN (V1) in the VLAN table 43 if an instruction to delete the port number "P1" of the source server 20 is received.

Flow of Process

Next, explanation will be below made of the flows of processes in the system relating to First Embodiment. The flow of process during the migration as to First Embodiment will be explained with reference to FIG. 7, then, the flow of member addition on the supervising server will be explained with reference to FIG. 8, and thereafter, the flow of member deletion as to First Embodiment will be explained with reference to FIG. 8.

Flow of Process During Migration

Figure 7:
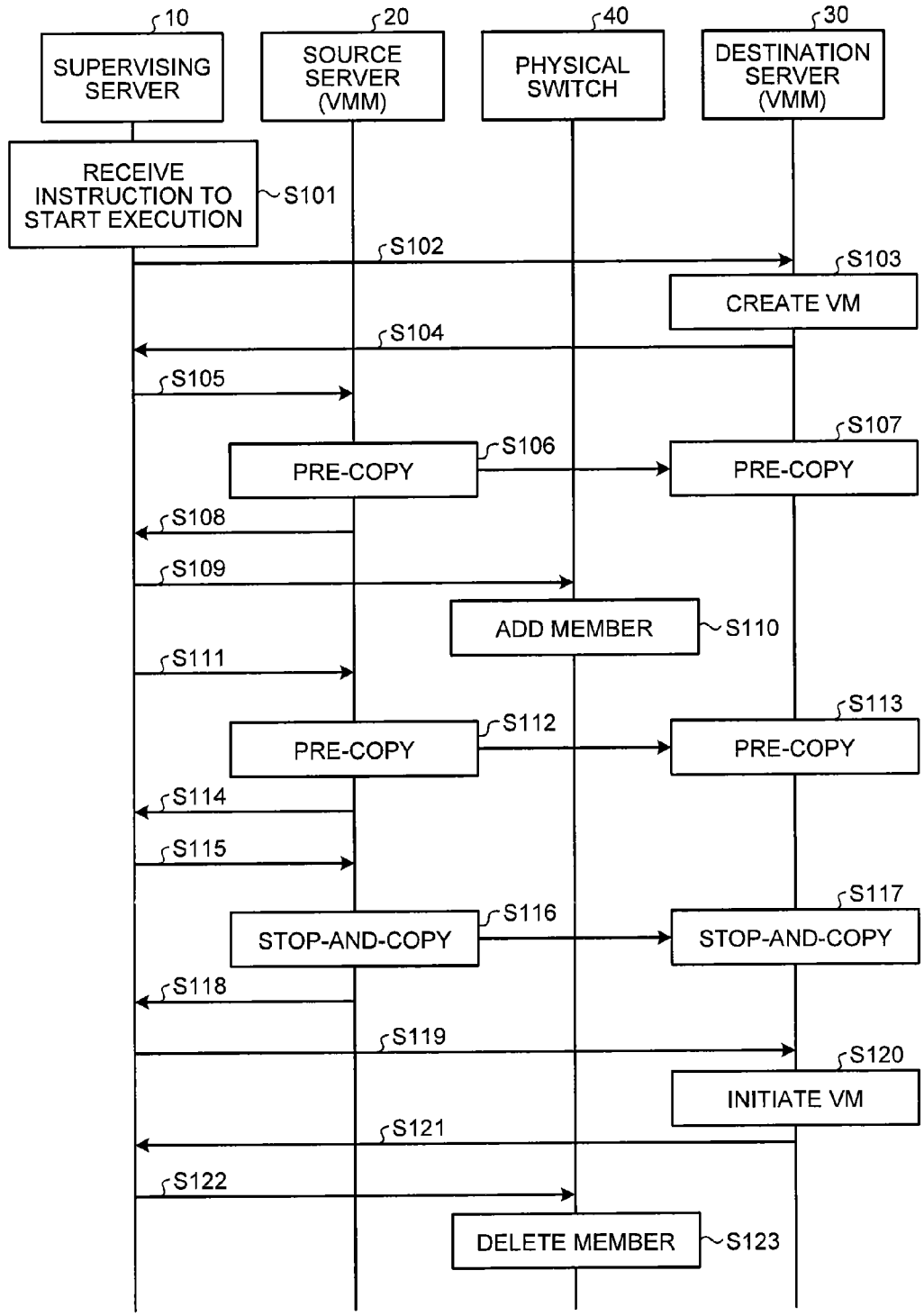
FIG. 7 is a sequence view illustrating a flow of a process during migration according to embodiment 1.

With reference to FIG. 7, explanation will be made of the flow of the process during the migration as to First Embodiment. FIG. 7 is a sequence view illustrating the flow of the process during the migration as to First Embodiment.

The VMM control unit 14a of the supervising server 10 transmits, when receiving a migration commencing instruction (S101), an instruction to create a VM to be transferred, to the destination server 30 (step S102). Further, a VMM on the destination server 30 creates a VM on the virtual machine area in accordance with thus received instruction (step S103), and transmits a creation completing instruction to the supervising server 10 when the creation is completed (step S104).

Next, the VMM control unit 14a of the supervising server 10 transmits an instruction to start pre-copy to the VMM 25 of the source server 20 (step S105). Thus, then, the VMM 25 of the source server 20 executes the pre-copy which is adapted to transfer the content of a memory used by itself, to a VMM on the destination server 30 (steps S106 and S107).

Thereafter, the physical switch control unit 14b of the supervising server 10 receives information of completing the pre-copy, from the source server 20 (step S108). Next, the physical switch control unit 14b executes VLAN control for controlling the VLAN configurations of VMs on the source server 20 and on the destination server 30 (step S109), due to the migration. That is, if the physical port of the determining server 30 does not belong to the VLAN used by the VM to be transferred, the member addition which adds the physical port of the destination server 30 to this VLAN, is carried out (step S110). It is noted that this process step S110 may be carried out at any occasion during the procedure from steps S101 to S118 indicated in FIG. 7, and further, it may be carried out at a stage preceding to step S101.

Then, even when the member addition is carried out by the supervising server 10, the VMM 25 of the source server 20 receives an instruction to start the pre-copy, from the supervising server 10, and repeats the pre-copy in accordance with a change amount in memory (steps S111 to S113).

Thereafter, the physical switch control unit 14b of the supervising server 10 receives information of completing the pre-copy from the source server 20 (step S114). Then, the VMM control unit 14a transmits an instruction to start the stop-and-copy to the VMM 25 of the source server 20 (step S115). Thus, the VMM 25 of the source server 20 temporarily stops the work of the VM to be transferred, which is carried out on the server of itself, and executes the stop-and-copy by which the memory content used by the VMM 25 itself is transferred to the VMM of the destination server 30 (steps S116 and S117).

Further, the VMM control unit 14a transmits, when receiving information of completion which indicates that the stop-and-copy is completed (step S118), an instruction to initiate the VM which has been newly created (or transferred), to the VMM of the destination server 30 (step S119). The VMM of the destination server 30 which has received the initializing instruction, initiates the VM which has been newly created (step S120), and then transmits the completion of the initialization to the supervising server 10 (step S121).

Then, the physical switch control unit 14b executes VLAN control for controlling the VLAN configurations of the VMs on the source server 20 and on the destination server 30 due to the migration (step S122). That is, the physical switch control unit 14b executes the member deletion which deletes the physical port of the source server 20 from the VLAN which has been used by the VM to be transferred (step S123) if another VM on the source server 20 does not use this VLAN.

Flow of Member Addition

Figure 8:
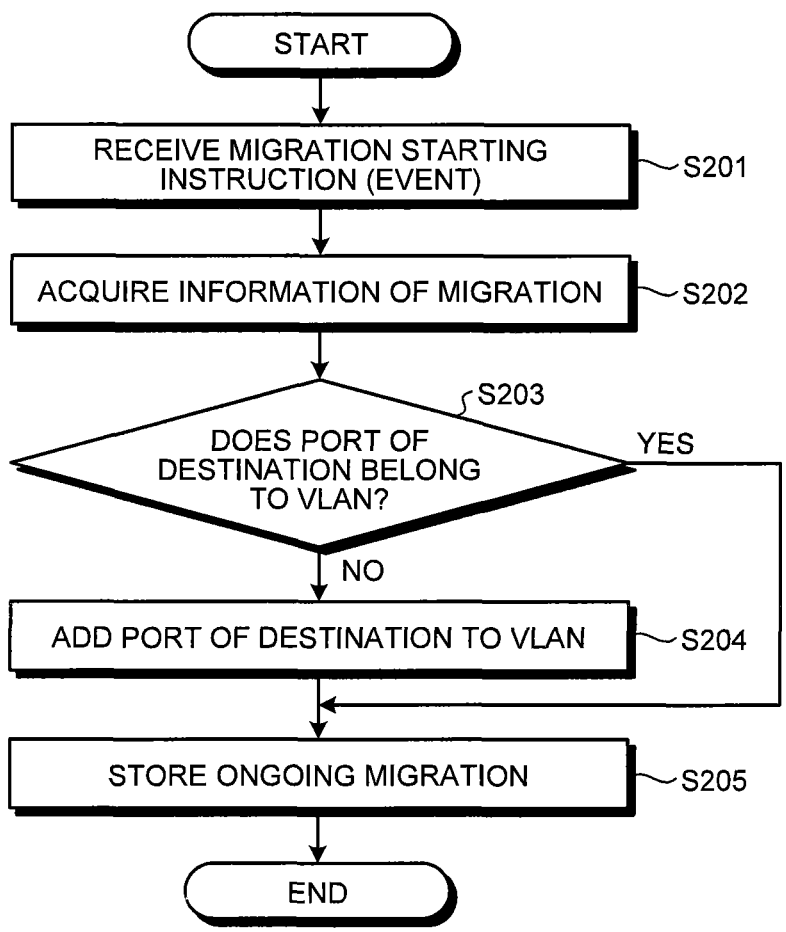
FIG. 8 is a flowchart illustrating a flow of member addition on the supervising server.

In reference to FIG. 8, explanation will be made of the member addition on the supervising server. FIG. 8 is a flowchart for explaining the flow of the member addition on the supervising server.

As illustrated in FIG. 8, the VMM control unit 14a of the supervising server 10 acquires, when receiving an instruction (event) to start the migration (step S201), migration information (step S202). For example, the VMM control unit 14a acquires "the VM1 of the source server 20 is transferred onto the destination server 30" or the like as "any one of VMs on any one of servers is transferred onto any other one of servers". As to the destination to be acquired, there are presented scheduled information and an input by the administrator or the like.

Then, the use control unit 14c of the physical switch control unit 14b refers to the VLAN table 43 of the physical switch 40 so as to determine whether the port number of the destination server 30 belongs to the VLAN which is used by the VM to be transferred or not (step S203).

Further, if the port number of the destination server 30 does not belong to the VLAN used by the VM to be transferred (NO at step S203), the use control unit 14c adds the port number of the destination server 30 to members on this VLAN (step S204). Specifically, the use control unit 14c transmits to the physical switch 40 an instruction to add members indicating "VLAN ID" to be added and "port number" to be added, and accordingly, the physical switch 40 updates the VLAN table 43 in accordance with the received instruction.

Meanwhile, if the port number of the destination server 30 belongs to the VLAN which is used by the VM to be transferred (YES at step S203), the use control unit 14c executes step S205.

Thereafter, the use control unit 14c stores the information of the ongoing migration in the storage unit 12 or the like (step S205). It is noted that the use control unit 14c deletes the information from the storage unit 12 when the ongoing migration is completed. Further, the information of the ongoing migration may include, for example, "source server, VM to be transferred, used VLAN, VLAN information of source server, and VLAN information of destination server".

Flow of Member Deletion

Figure 9:
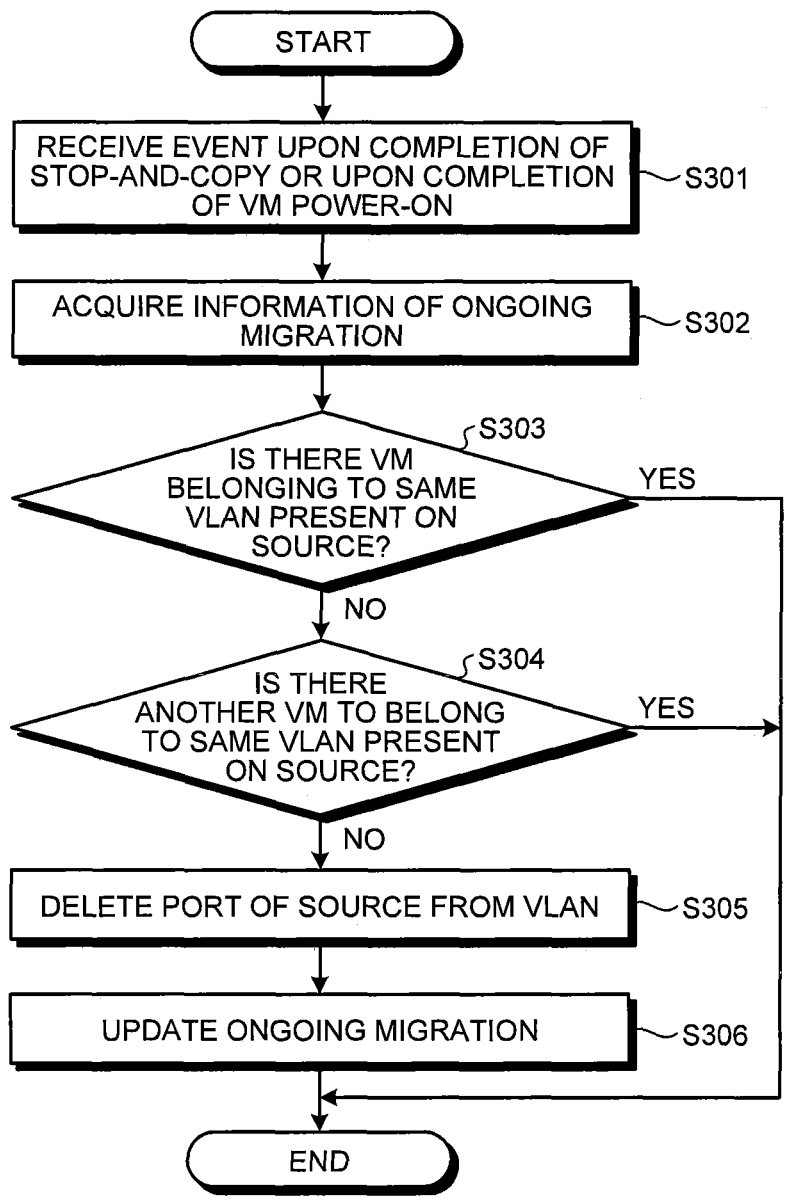
FIG. 9 is a flowchart illustrating a flow of member deletion on the supervising server.

With reference to FIG. 9, explanation will be made of the flow of the member deletion on the supervising server. FIG. 9 is a flowchart for indicating the flow of the member deletion on the supervising server.

As illustrated in FIG. 9, the VMM control unit 14a of the supervising server 10 acquires the information of the ongoing migration (step S302) when it receives an event upon completion of stop-and-copy or upon completion of VM power-on (step S301). Thus, it is possible to specify which one of migrations is completed.

Then, the use determining unit 14d of the physical switch control unit 14b refers to the VLAN table 43 of the physical switch 40 so as to determine whether a VM which belongs to the same VLAN is present on the source server 20 or not (step S303). Further, if the use determining unit 14d determines that the VM which belongs to the same VLAN is not present on the source server 20 (NO at step S303), it determines whether another VM which belongs to the same VLAN on the source server 20 is on the migration or not (step S304).

Next, it is assumed that the use determining unit 14*d* determines that another VM which belongs to the same VLAN on the source server 20 is not on the migration (NO at step S304). In this case, the use stop unit 14*e* deletes the port number of the source server 20 from the members of this VLAN (step S305). Specifically, the use stop unit 14*e* transmits to the physical switch 40 an instruction to delete the members which indicate the "VLAN ID" to be deleted and the "port Number" to be deleted, and the physical switch 40 updates the VLAN table 43 in accordance with the received instruction.

Thereafter, the use stop unit 14*e* updates the ongoing migration to be stored in the storage unit 12 (step S306).

Meanwhile, if the use determining unit 14d determines that the VM which belongs to the same VLAN exists on the source server 20 (YES at step S303), the use stop unit 14*e* stops the process without executing the process steps from S304 to S306. Further, if the use determining unit 14*d* determines that another VM which belongs to the same VLAN on the source server 20 is on the migration (YES at step S304), the use stop unit 14*e* stops the process without executing the process steps S305 and S306.

Technical Effects by First Embodiment

Thus, with the configuration of First Embodiment, if the physical port of the destination server 30 which is a destination of VM to be transferred due to the migration, does not belong to the VLAN which is used by the VM to be transferred, the supervising server 10 adds the physical port of the destination server 30 to this VLAN. Further, when the VM to be transferred has been transferred onto the destination server 30 due to the migration, the supervising server 10 determines whether the VLAN which has been used by the VM to be transferred is used by another VM on the source server 20 or not. Thereafter, if determination is such that it is not used by another VM on the source server 20, the supervising server 10 deletes the physical port of the source server 20 from the VLAN which has been used by VM to be transferred. As a result, it is possible to prevent generation of unnecessary traffics caused by the migration.

Further, with the configuration of First Embodiment, the migration may be efficiently carried out by using a high speed Ethernet (Registered Trademark) even in the environment which is aggregated by using not only a network but also a storage FCoE (Fiber Channel over Ethernet (Registered Trademark)). By optimizing the setting of the physical switch in association with the migration of the virtual machine, unnecessary traffics can be eliminated. Even though the migration is carried out when IGMP snooping is being executed, the destination server may continue its work.

[b] Second Embodiment

Although the explanation has been hereinabove made of First Embodiment as an example in which the supervising server 10 refers to the VLAN table 43 of the physical switch 40 so as to add and delete a member to and from the members of the VLAN, the present invention is not limited to this example. For example, the supervising server 10 stores, in the storage unit 12, the VLAN information after the execution of the migration (after the transfer of the VM), which is received from the administrator or the like, as a scheduled set. Further, the supervising server 10 may add and delete a member to and from the members of the VLAN in accordance with the stored scheduled set.

Thus, in Second Embodiment, explanation will be made of an example in which a member is added to or deleted from the members of the VLAN with the use of the scheduled set. The migration process relating to Second Embodiment will be explained with reference to FIGS. 10 to 12, then the member addition will be explained with reference to FIG. 13, and thereafter, with reference to FIG. 14, the member deletion will be explained.

Figure 10:
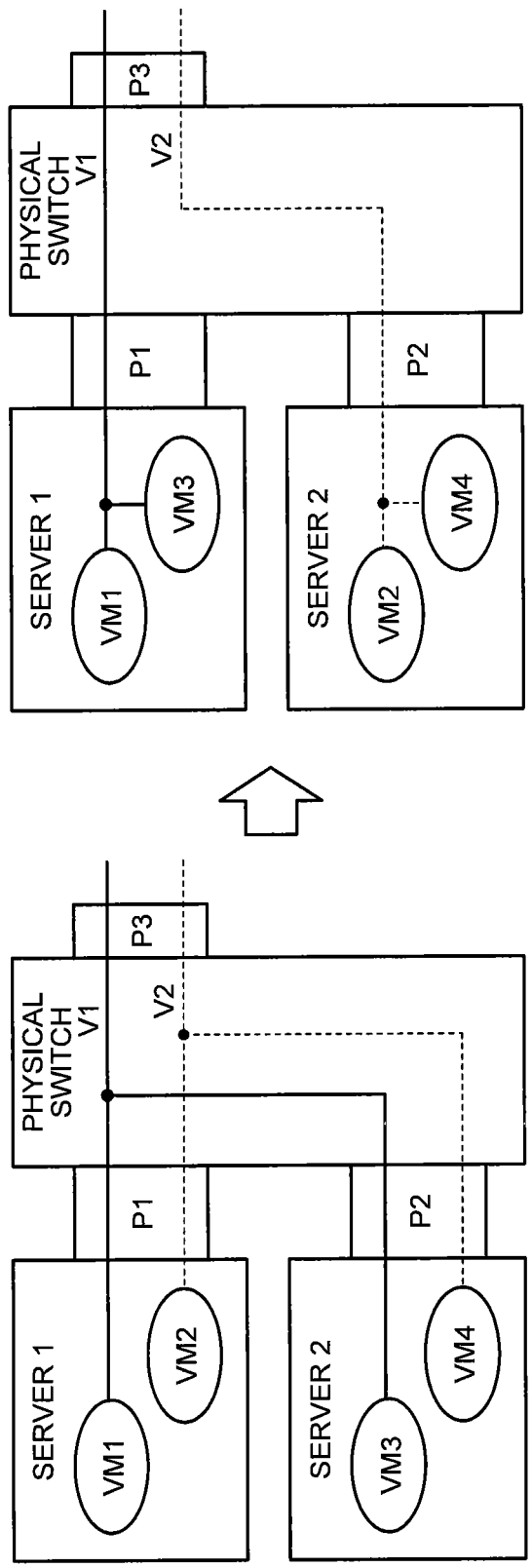
FIG. 10 is a flowchart for explaining VM configurations before and after the process of migration in Second Embodiment.

Migration Process according to Second Embodiment FIG. 10 is a view for explaining VM configurations before and after the process of the migration in Second Embodiment. FIG. 11 is a view illustrating the current VLAN setting information when the migration is started. FIG. 12 is a view illustrating VLAN setting information after completion of the migration, which is to be stored as a scheduled set.

As illustrated in the left side part of FIG. 10, a VM1 which belongs to a VLAN (V1) and a VM2 which belongs to a VLAN (V2) are initiated on a server 1. Further, a VM3 which belongs to the VLAN (V1) and a VM4 which belongs to the VLAN (V2) are initiated on a server 2. Further, the server 1 is connected to a physical switch via a physical port P1 while the server 2 is connected to the physical switch via a physical port P2, and the physical switch is connected to another server via a physical port P3.

Explanation will be made of the example in which the above-mentioned condition is shifted into such a condition that only the VM1 and the VM3 which belong to the VLAN (V1) are initiated on the server 1, and only the VM2 and the VM4 which belong to the VLAM(V2) are initiated on the server 2 as illustrated in the right side part of FIG. 10.

Accordingly, the VLAN table 43 of the physical switch 40 stores "V1: P1, P2, P3, V2: P1, P2, P3" as the current VLAN information, as depicted in FIG. 11. That is, the VLAN table 43 stores the condition that the physical ports P1, P2, P3 which are depicted in FIG. 10, belong each of the VLAN(V1) and the VLAN(V2) before the migration.

Meanwhile, the storage unit 12 of the supervising server 10 stores "V1: P1, P3, V2: P2, P3" as the information after the transfer, as depicted in FIG. 12. That is, the storage unit 12 stores, as the scheduled set, the condition that the physical ports P1, P3 depicted in FIG. 10 belong to the VLAN(V1) while the physical ports P2, P3 belong to the VLAN(V2) after the transfer of the VMs caused by the execution of the migration.

In this condition, when the transfer of the VM2 from the server 1 to the server 2 is started, the supervising server 10 compares the current VLAN information before the execution of the migration (before the transfer) (FIG. 11) with the VLAN information after the execution of the migration (after the transfer) (FIG. 12). Further, the supervising server 10 determines that the physical port (P2) of the server 2 belongs to the V2 after the execution of the migration. Thus, no change in the LAN setting caused by the transfer of the VM2 from the server 1 to the server 2 and relating to the destination server is made.

Next, when the transfer of the VM3 from the server 2 to the server 1 is started, the supervising server 10 compares the current VLAN information before the execution of the migration (FIG. 11) with the VLAN information after the execution of the migration (FIG. 12). Further, the supervising server 10 determines that the physical port (P1) of the server 1 belongs to the V1 after the execution. Thus, no change in the VLAN setting caused by the transfer of VM3 from the server 2 to the server 1 and relating to the destination server is made.

Thereafter, when the transfer of the VM2 from the server 1 to the server 2 is completed, the supervising server 10 compares the current VLAN information before the execution of the migration (FIG. 11) with the VLAN information after the execution of the migration (FIG. 12). Then, the supervising server 10 determines that the physical port (P1) of the server 1 does not belong to the V2 after the execution. Thus, the supervising server 10 executes such a process as to cause the physical switch 40 to delete the P1 from the V2.

Further, when the transfer of the VM3 from the server 2 to the server 1 is completed, the supervising server 10 compares the current VLAN information before the execution of the migration (FIG. 11) with the VLAN information after the execution of the migration (FIG. 12). Then, the supervising server 10 determines that the physical port (P2) of the server 2 does not belong to the V1 after the execution. Thus, the supervising server 10 executes such a process as to cause the physical switch 40 to delete the P2 from the V1.

Flow of Member Addition According to Second Embodiment

Next, explanation will be made of the flow of the member addition according to Second Embodiment with reference to FIG. 13 which is a flowchart illustrating the flow of the member addition on the supervising server according to Second Embodiment.

Figure 13:
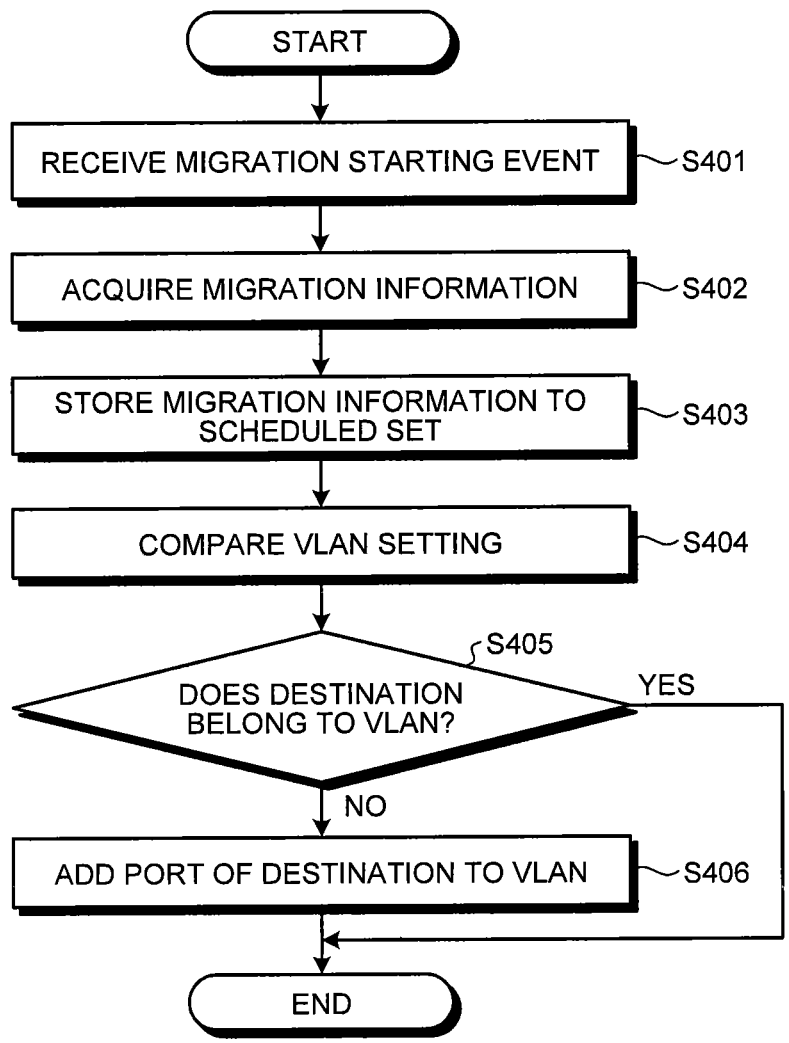
FIG. 13 is a flowchart illustrating a flow of member addition on a supervising server according to Second Embodiment.

As depicted in FIG. 13, the VMM control unit 14a of the supervising server 10 acquires, when receiving a migration commencing event (step S401), a migration information (step S402). For example, the VMM control unit 14a acquires "VM to be transferred, VLAN information of the source server, VLAN information of the destination server" and so forth, as the migration information.

Then, the use control unit 14c of the physical switch control unit 14b stores in the storage unit 12 the migration information as a scheduled set (step S403). For example, the use control unit 14c stores, in the storage unit 12, the VLAN information of the respective servers after the execution of the migration, which has been acquired at step S402, as the schedule set.

Further, the use control unit 14c compares the current VLAN information with the VLAN information of each server after the execution of the migration, which has been stored as a schedule set (step S404). Next, the use control unit 14c determines whether the port number of the destination server belongs to a VLAN which is used by a VM to be transferred or not (step S405). For example, the use control unit 14c acquires the current VLAN information of each server from the VLAN table 43 of the physical switch 40. Further, the use control unit 14c compares the acquired current VLAN information of each server with the VLAN information which is stored as a scheduled set.

Thereafter, if the port number of the destination server does not belong to the VLAN which is to be used by the VM to be transferred (NO at step S405), the use control unit 14c adds the port number of the destination server to the members of the VLAN (step S406). Meanwhile, if the port number of the destination server belongs to the VLAN which is to be used by the VM to be transferred (YES at step S405), the use control unit 14c ends the process without executing step S406.

Incidentally, in same cases the use control unit 14c does not acquire the current VLAN information of each server from the VLAN table 43 of the physical switch 40 each time when the migration is executed. For example, the use control unit 14c which has stored the information beforehand after the last transfer, may use this information stored after the last transfer, as the current information. Alternatively, the use control unit 14c may receive from the administrator or the like at step S402.

Flow of Member Deletion According to Second Embodiment

Figure 14:
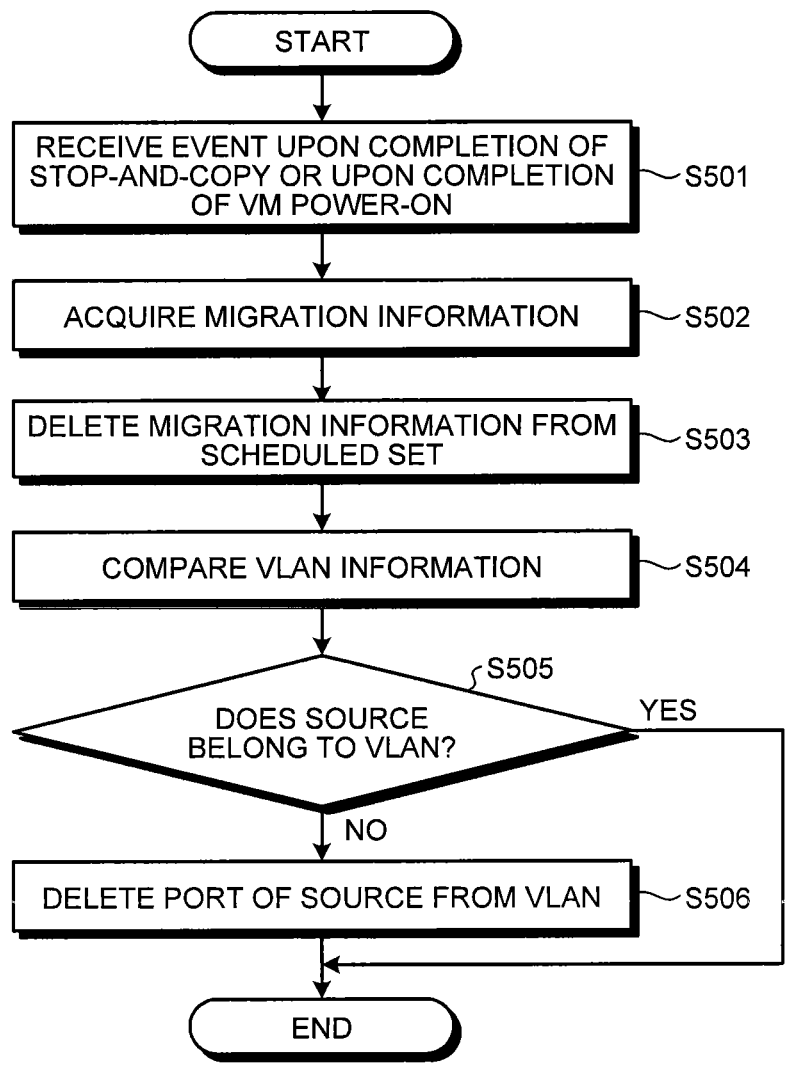
FIG. 14 is a flowchart illustrating a flow of member deletion on the supervisor server according to Second Embodiment.

Explanation will be made of the follow of member deletion on the supervising server according to Second Embodiment with reference to FIG. 14. FIG. 14 is a flowchart illustrating the flow of member deletion on the supervising server according to Second Embodiment.

As illustrated in FIG. 14, the VMM control unit 14a of the supervising server 10 acquires the information of completed migration (step S502) when it receive an event upon completion of stop-and-copy or upon completion of the VM power-on (step S501). For example, this information is stored in the storage unit 12 or the like after it is suffixed with an identifier which can identify the instant migration from the migration which is currently executed, being associated with these migrations. Accordingly, it is possible to specify the completed migration by acquiring the identifier of the completed migration.

The use determining unit 14d deletes the acquired information of the completed migration from the scheduled set (step S503), and compares the current VLAN information with the VLAN information after execution of the migration (step S504). It is noted that the deletion from the scheduled set may be carried out subsequent to step S504 or step S506.

Then, the use determining unit 14d determines whether any VM which belongs to the same VLAN as that of the transferred VM is present on the source server or not (S505). Further, the use determining unit 14d deletes, when determining as no VM belong to the same VLAN is present on the source server (NO at step S505), the port number of the source server from the members of this VLAN (step S506). Meanwhile, the use stop unit 14e ends the process without executing step S506 if the use determining unit 14d has determined that a VM which belongs the same VLAN as that of the transferred VM is present on the source server (YES at step S505).

Technical Effects by Second Embodiment

Thus, according to Second Embodiment, with the used of the scheduled set, the current condition of VLAN setting is compared to the condition of VLAN setting after the migration. As a result, the setting of the physical switch can be efficiently optimized being adapted to the transfer of a virtual machine, thereby it is possible to efficiently eliminate unnecessary traffics.

[c] Third Embodiment

Figure 15:
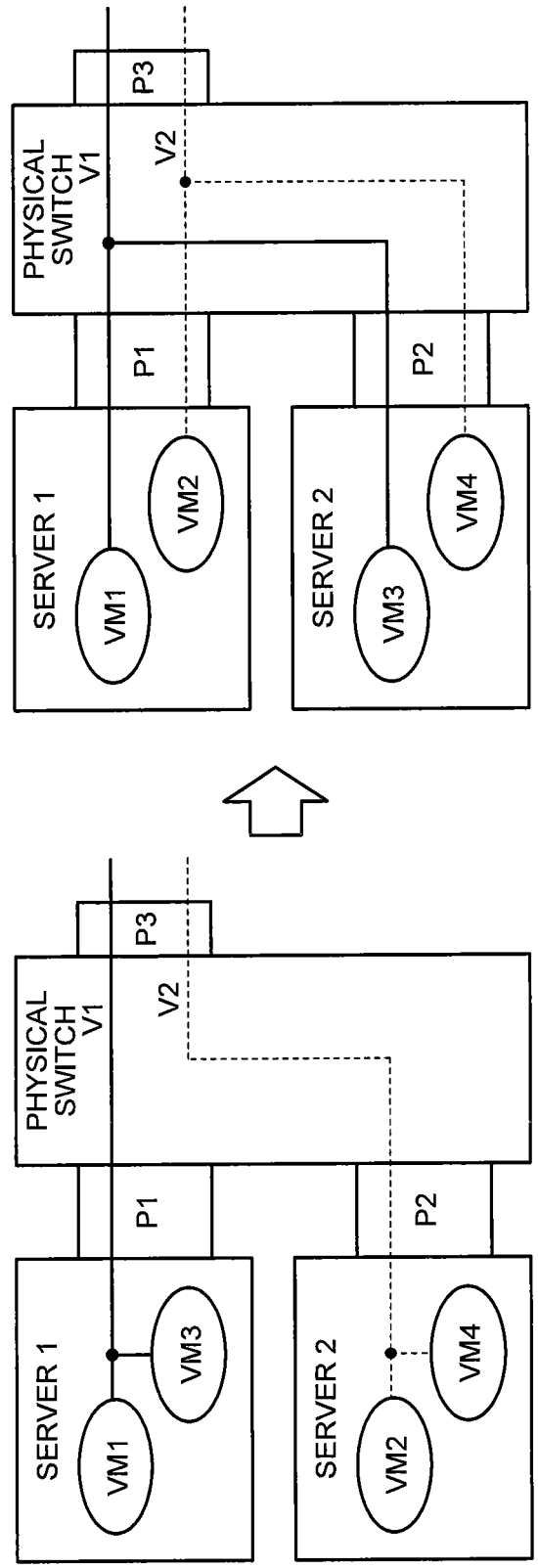
FIG. 15 is a view for explaining VM configurations before and after the process of migration in Third Embodiment.

In Third Embodiment, explanation will be made of another example which uses the scheduled set explained in Second Embodiment, with reference to FIGS. 15 to 17. FIG. 15 is a view for explaining the VM configurations before and after execution of migration in Third Embodiment. FIG. 16 is a view illustrating the current information of VLAN setting at the time when the migration is started. FIG. 17 is a view illustrating the information of VLAN setting after completion of the migration, which is stored in the form of a scheduled set.

As illustrated in the left side part of FIG. 15, a VM1 and a VM3 which belong to a VLAN (V1) are initiated on a server 1. Further, a VM2 and a VM4 which belong to a VLAN(V2) are initiated on a server 2. Moreover, the server 1 is connected to a physical switch via a physical port P1 while the server 2 is connected to the physical switch via a physical port P2, and further, the physical switch is connected another server via a physical port P3.

The example that the above-mentioned condition is shifted into a condition depicted in the right side part of FIG. 15 will be explained. Specifically, the condition is such that the VM1 which belongs to the VLAN(V1) and the VM3 which belongs to the VLAN(V2) are initiated on the server 1, and further, the VM3 which belongs to the VLAN(V1) and the VM4 which belongs to the VLAN(V2) are initiated on the server 2.

Accordingly, as depicted in FIG. 16, the VLAN table 43 of the physical switch 40 stores "V1: P1, P3, V2: P2, P3" as the current VLAN information. That is, the VLAN table 43 stores such a condition that physical ports P1, P3 depicted in FIG. 15 belong to the VLAN(V1) while the physical ports P2, P3 belong to the VLAN(V2) before the transfer of the VMs by the execution of the migration.

Meanwhile, the storage unit 12 of the supervising server 10 stores "V1: P1, P2, P3, V2: P1, P2, P3" as the VLAN information before the transfer, as illustrated in FIG. 17. That is, the storage unit 12 stores such a condition that the physical ports P1, P2, P3 depicted in FIG. 15 belong to each of the VLAN(V1) and VLAN(V2) after the transfer of the VMs by the execution (completion) of the migration.

In the above-mentioned condition, when the transfer of the VM3 from the server 1 to the server 2 is started, the supervising server 10 compares the current VLAN information before the execution of the migration (FIG. 16) with the VLAN information after the execution (completion) of the migration (FIG. 17). Further, the supervising server 10 determines that the physical port (P2) of server 2 after the execution does not belong to the V1. Accordingly, the supervising server 10 carries out such a process as to cause the physical switch 40 to add the P2 to the V1.

Then, when the transfer of the VM2 from the server 2 to the server 1 is started, the supervising server 10 compares the current VLAN information before the execution of the migration (FIG. 16) with the VLAN information after the completion of the migration (FIG. 17). Further, the supervising server 10 determines that the physical port (P1) of the server 1 after the execution does not belong to the V2. Accordingly, the supervising server 10 carries out such a process as to cause the physical switch 40 to add the P1 to the V2.

Thereafter, when the transfer of the VM3 from the server 1 to the server 2 is completed, the supervising server 10 compares the current VLAN information before the execution of the migration (FIG. 16) with the VLAN information after the completion of the migration (FIG. 17). Further, the supervising server 10 determines that the physical port (P1) of the server 1 after the execution belongs to the V1. Thus, no change in the VLAN setting as to the source server, which is caused by the transfer of the VM3 from the server 1 to the server 2 is made.

Further, when the transfer of the VM2 from the server 2 to the server 1 is completed, the supervising server 10 compares the current VLAN information before the execution of the migration (FIG. 16) with the VLAN information after the execution of the migration (FIG. 17). Then, the supervising server 10 determines that the physical port (P2) of the server 2 after the execution belongs to the V1. Thus, no change in the VLAN setting as to the source server, which is caused by the transfer of the VM2 from the server 2 to the server 1 is made.

Thus, according to Third Embodiment, similar to Second Embodiment, with the use of the scheduled set, the current VLAN setting condition is compared to the VLAN setting condition after the migration. As a result, the setting of the physical switch may be efficiently optimized, being adapted to the transfer of the virtual machines, even with any setting condition, thereby it is possible to efficiently eliminate unnecessary traffics.

[d] Fourth Embodiment

Figure 18:
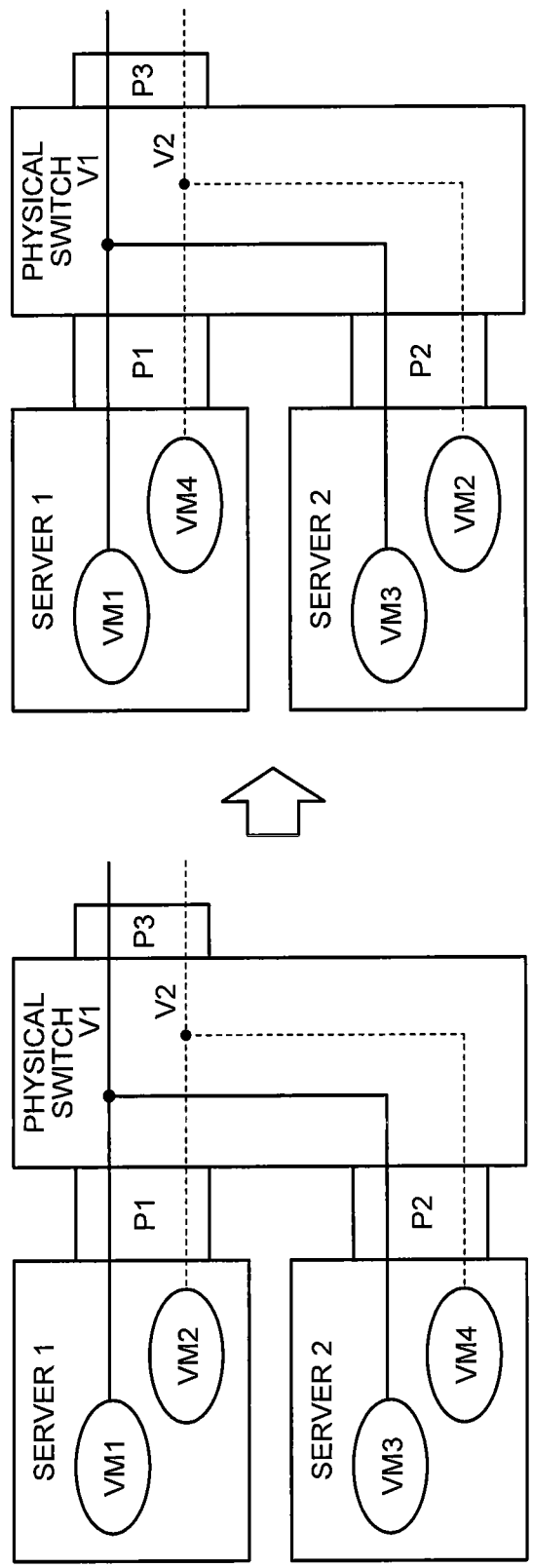
FIG. 18 is a view for explaining VM configurations before and after the process of the migration in Fourth Embodiment.

In Fourth Embodiment, explanation will be made of the example that VMs which belong to the same VLAN are respectively transferred at the same time between the source server and the destination server, with reference to FIGS. 18 to 20. FIG. 18 is a view illustrating a VM configuration after the execution of the migration in Fourth Embodiment while FIG. 19 is a view illustrating the current VLAN setting information at the time when the migration is started, and FIG. 20 is a view illustrating the VLAN setting information, after the completion of the migration, which is stored as a scheduled set.

As depicted in the left side part of FIG. 18, a VM1 which belongs to a VLAN(V1) and a VM2 which belongs to a VLAN(V2) are initiated on a server 1. Further, a VM3 which belongs to the VLAN(V1) and a VM4 which belongs to the VLAN(V2) are initiated on a server 2. Further the server 1 is connected to a physical switch via a physical port P1 while the server 2 is connected to the physical switch via a physical port P2, and the physical switch is connected to another server via a physical port P3.

The example that the above-mentioned condition is shifted into the condition which is depicted in the right side unit of FIG. 18, will be explained. Specifically, the server 1 is in the condition that the VM1 which belongs to the VLAN (V1) and the VM4 which belongs to the VLAN(V2) are initiated. The server 2 is in the condition that the VM3 which belongs to the VLAN(V1) and the VM2 which belongs to the VLAN(V2) are initiated.

Accordingly, the VLAN table 43 of the physical switch 40 stores "V1: P1, P2, P3, V2: P1, P2, P3" as depicted in FIG. 19, as the current VLAN information. That is, the VLAN table 43 stores, before the transfer of the VMs caused by the migration, the condition that the physical ports P1, P2, P3 depicted in FIG. 18 are connected to each of the VLAN(V1) and the VLAN(V2).

Meanwhile, the storage unit 12 of the supervising server 10 stores "V1: P1, P2, P3, V2: P1, P2, P3" as illustrated in FIG. 20, as the VLAN information after the transfer. That is, the storage unit 12 stores, after the transfer of the VMs caused by the execution of the migration, the condition that the physical ports P1, P2, P3 depicted in FIG. 20 belong to each of the VLAN(V1) and the VLAN(V2).

In the above-mentioned condition, when the transfer of the VM2 from the server 1 to the server 2 is started, the supervising server 10 compares the current VLAN information before the execution of the migration (FIG. 19) with the VLAN information after the completion of the migration (FIG. 20). Then, the supervising server 10 determines that the physical port (P2) of the server 2 after the execution belongs to the V2. Accordingly, no change in the VLAN setting as to the destination server, caused by the transfer of the VM2 from the server 1 to the server 2 is made. Further, the information relating to this migration is stored as an ongoing information in the storage unit 12.

Then, when the transfer of the VM4 from the server 2 to the server 1 is started, the supervising server 10 compares the current VLAN information before the execution of the migration (FIG. 19) with the VLAN configuration after the completion of the migration (FIG. 20). Then, the supervising server 10 determines that the physical port (P1) of the server 1 after execution belongs to the V2. Thus, no change in the VLAN setting relating to the source server and caused by the transfer of VM3 from the server 1 to the server 2 is made. Further, the information relating to this migration is stored as the ongoing information in the storage unit 12.

Thereafter, when the transfer of the VM2 from the server 1 to the server 2 is completed, the supervising server 10 compares the current VLAN information before the execution of the migration (FIG. 19) with the VLAN configuration after the completion of the migration (FIG. 20). Further, the supervising server 10 determines that the physical port (P1) of the server 1 after execution belongs to the V1. Thus, no change in the VLAN setting caused by the transfer of VM2 from the server 1 to the server 2 and relating to the source server is made. Further, the information as to this migration is deleted from the ongoing information which is to be stored in the storage unit 12.

Further, when the transfer of the VM4 from the server 2 to the server 1 is completed, the supervising server 10 compares the current VLAN information before the execution of the migration (FIG. 19) with the VLAN configuration after the completion of the migration (FIG. 20). Then, the supervising server 10 determines that the physical port (P2) of the server 2 belongs to the V2. Thus, no change in the VLAN setting caused by the transfer of the VM4 from the server 2 to the server 1 and relating the source server is made. Further, the information as to this migration is deleted from the ongoing information which is to be stored in the storage unit 12.

Thus, according to Fourth Embodiment, if the VMs which belong to the same VLAN are transferred between the source server and the destination server, the ongoing information of the respective migrations and scheduled sets are stored under supervision in the storage unit 12. As a result, the execution of useless VLAN setting can be restrained, thereby it is possible to efficiently execute the migration.

[e] Fifth Embodiment

Although explanation has been hereinabove made of the embodiments of the present invention, the present invention may be implemented in various forms other than the above-mentioned embodiments. Thus, explanation will be made of different embodiments.

Technique for Use Start Control and Stop Control

Although the exemplification has been hereinabove made of the technique for adding the physical port to the members of the VLAN as the control with which the physical port can use the VLAN in the above-mentioned First to Fourth Embodiments, the present invention is not limited to this technique. For example, there may be used such a technique that flags such as "usable condition" are prepared in the VLAN table 43 of the physical switch 40, and "ON" is registered if it is usable and "OFF" is registered if it is unusable. Further, although the exemplification has been hereinabove made of such a technique that the physical port is deleted from the members of the VLAN as the control with which the physical port does not use the VLAN, the present invention is not also limited to this technique. Similar to the above-mentioned example, there may be used such a technique that with flags such as "usable condition" are prepared in the VLAN table 43 of the physical switch 40, and "ON" is registered if it is usable and "OFF" is registered if it is unusable.

System

Of the processes explained in the above-mentioned embodiments, those have been explained so as to be automatically carried out. However, all or a part of them may be manually carried out. Alternatively, all or a part of those which have been explained so as to be manually carried out, may be automatically carried out in the well-known manner. In addition, the process steps, the control steps and the specific names, which are indicated in the description hereinabove and the drawings, the information including various data or parameters as illustrated, for example, FIGS. 3, 4 and 6 to 16 and so forth, may be arbitrarily changed or altered unless otherwise specified.

Furthermore, the components of each device illustrated in the drawings are functionally conceptual ones, and do not always have to be physically configured as illustrated in the drawings. Namely, for example, the VMM control unit 14a and the physical switch control unit 14b may be integrally incorporated. In general, the specific forms of the dispersions and the integrations of the apparatuses is not limited to these depicted in the drawings. Further, the physical switch 40 may be provided with the control units, instead of the supervising server 10. That is, all or a part of them may be formed by functionally or physically dispersing or integrating them with arbitrary units, depending upon various loads or use conditions or the like. Further, various process functions carried out in the apparatuses may be all or in part materialized by a CPU or programs which are analyzed and carried out by the CPU, or may also be materialized as hardware by wired logics.

Program

By the way, the various processes which have been explained in the above-mentioned embodiments, may be materialized by carrying out programs which have been prepared beforehand, with the use of a computer system such as a personal computer or a workstation. Thus, explanation will be made of an example of the computer system which executes the programs having functions similar to those of the above-mentioned embodiments.

Figure 21:
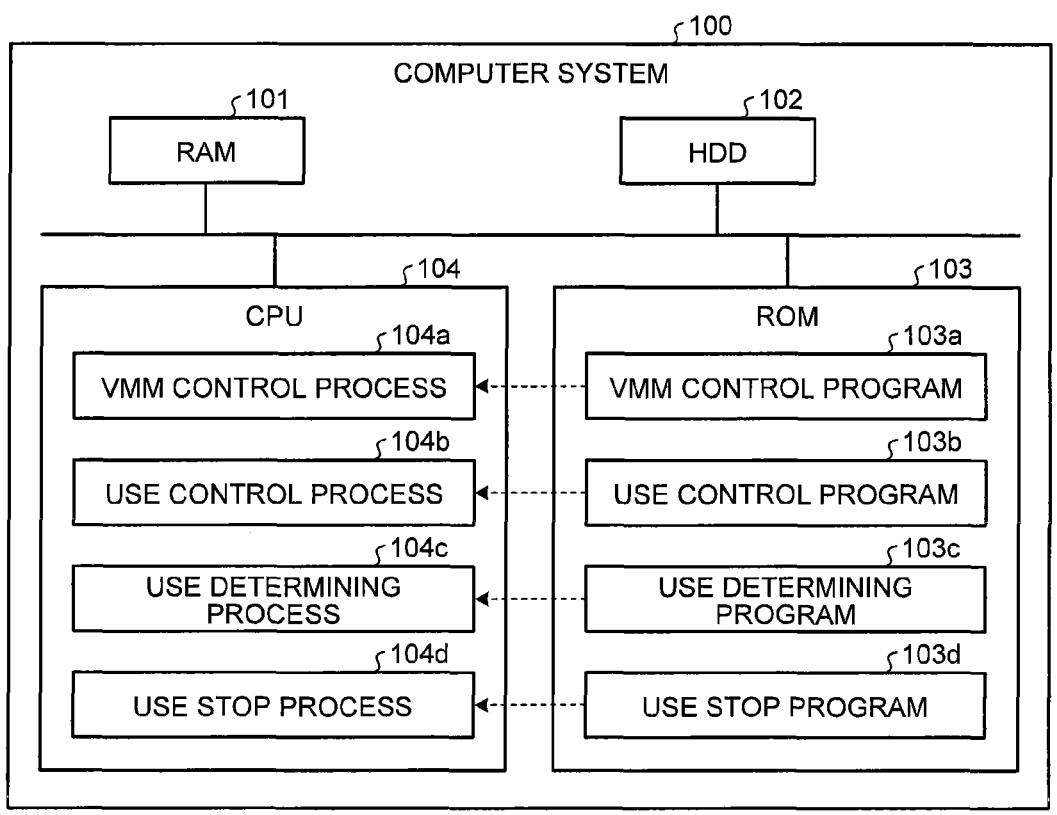
FIG. 21 is a view illustrating a computer system which carries out a migration control program.
Figure 22:
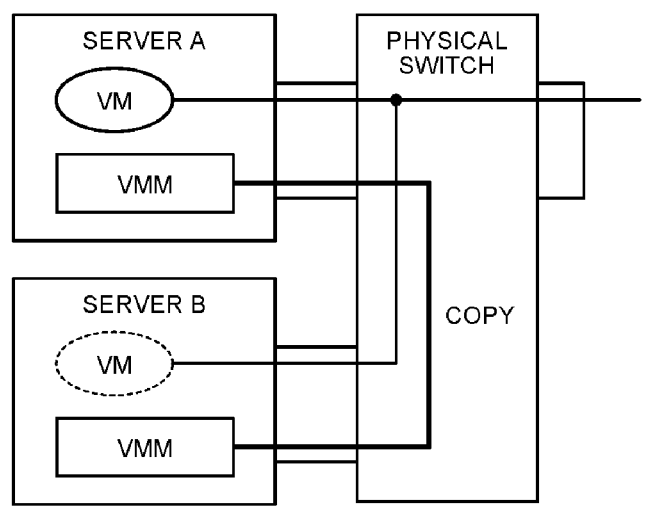
FIG. 22 is a view illustrating a system which carries out live-migration.
Figure 23:
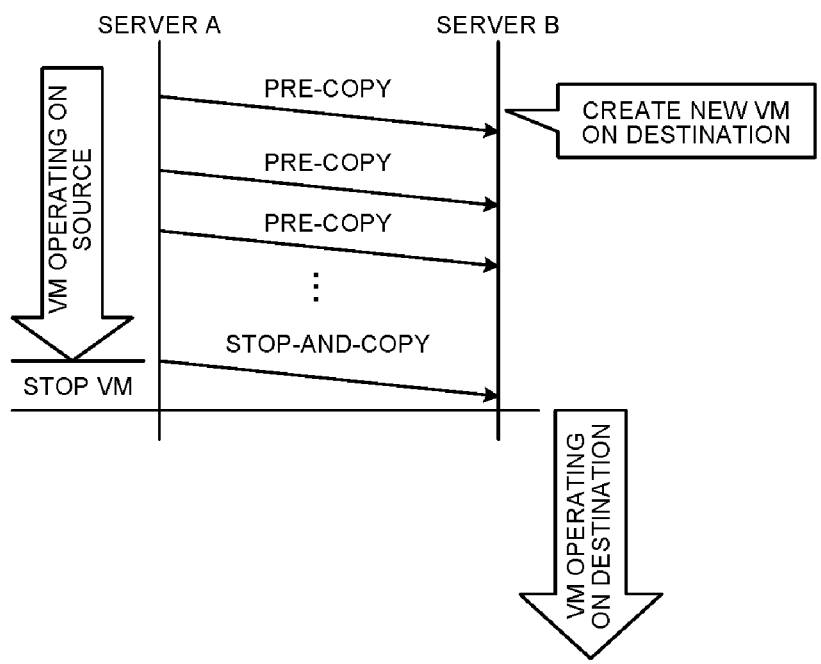
FIG. 23 is a view illustrating an operation sequence of the live-migration.
Figure 24:
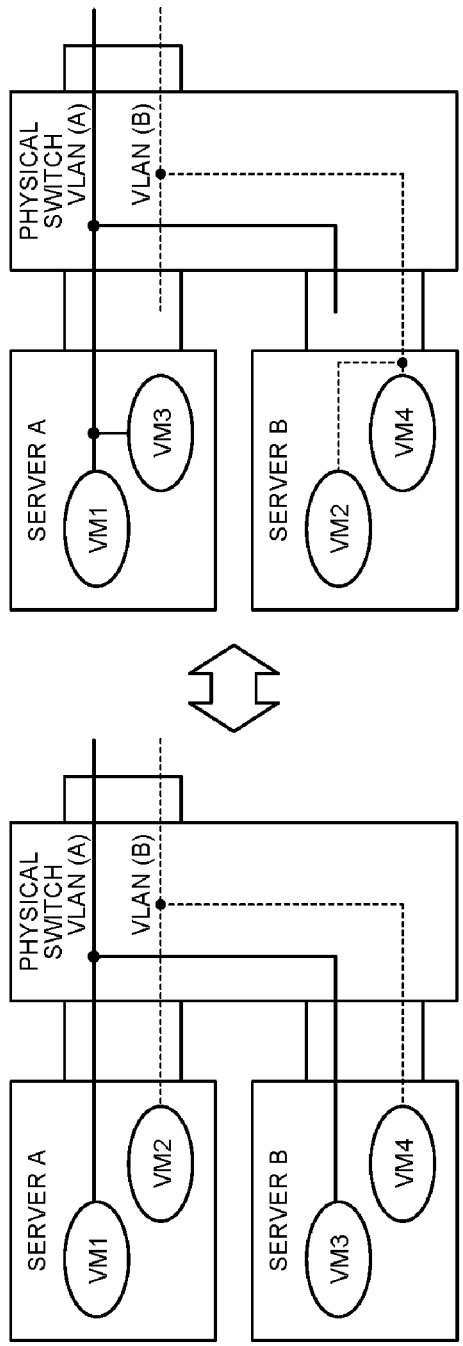
FIG. 24 is a view illustrating a result of the live-migration according to the prior art.

FIG. 21 is a view illustrating a computer system which executes migration control programs. As illustrated in FIG. 21, a computer system 100 includes a RAM 101, an HDD 102, a ROM 103 and a CPU 104. In the ROM 103, there have been stored beforehand programs capable of exhibiting the functions similar to those of the above-mentioned embodiments. That is, as illustrated in FIG. 21, there have been stored beforehand a VMM control program 103a, a use control program 103b, a use determining program 103c and a use stop program 103d.

Further, the CPU 104 reads and executes these programs 103a to 103d so as to materialize the processes depicted in FIG. 21, that is, a VMM control process 104a, a use control process 104b, a use determining process 104c and a use stop process 104d. It is noted that the VMM control process 104a corresponds to the VMM control unit 14a depicted in FIG. 2, and similarly, the use control process 104b corresponds to the use control unit 14c. Further, the use determining process 104c corresponds to the use determining unit 14d, and the use stop process 104d corresponds to the use stop unit 14e. Further, the HDD 102 is provided therein with areas for storing data with which the above-mentioned process are carried out, and temporary areas.

By the way, in same cases the above-mentioned programs 103a to 103d is not stored in the ROM 103. For example, they may be stored in "a portable physical medium" which is inserted into the computer system, such as a flexible disc (FD), a CD-ROM, a DVD disc, an MO disc or an IC card. Alternatively, they may be stored in "a stationary physical medium" such as a hard disk drive (HDD) provided outside and inside of the computer system 100. Further, there may be stored in "another computer system" which is communicated with the computer system 100 via public lines, the Internet, LANs or WANs. Further, the computer system 100 may read the programs from these media or another computer so as to execute the same.

That is, the programs explained in these other embodiments are stored on "the portable physical medium," "the stationary physical medium," "the communication medium" or the like as stated above, from which a computer may read these programs. Further, the computer system 100 reads the programs from these storage media so as to execute the same in order to exhibit the functions similar to those of the embodiments as stated above. It is noted that the programs explained in these other embodiments is not limited to those which are executed by the computer system 100 alone. For example, the present invention may be applied to the case that the programs are executed by another computer system or another server and also may be applied to a case that the programs are executed by them in cooperation with each other.

In view of one aspect of the disclosure by the present invention, that is, the virtual network control program, the virtual network control method or the information processing apparatus, there can be exhibited the technical effect that unnecessary traffic caused by executing the live-migration can be prevented from being generated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a virtual network control process, the virtual network control process comprising:

migrating a first virtual machine that uses a first virtual network and runs on a first information processing apparatus to a second information processing apparatus connected to the first information processing apparatus using a physical switch;

referring to a virtual network storing unit of the physical switch, the virtual network storing unit storing first information that associates information of a first physical port of the physical switch connected to the first information processing apparatus and information of a virtual network including the first virtual network to which the first physical port belongs and second information that associates information of a second physical port of the physical switch connected to the second information processing apparatus and information of a virtual network including a second virtual network to which the second physical port belongs, when the second physical port connected to the second information processing apparatus which is a migration destination of the first virtual machine does not belong to the first virtual network, first transmitting, to the physical switch, an instruction to add information relating to the first virtual network to the second information which is stored in the virtual network storing unit during the migration of the first virtual machine which is started at the migration;

when the first virtual machine migrates to the second information processing apparatus, referring to the virtual network storing unit and an address storing unit of the physical switch which stores in association with information of another virtual machine running on the first information processing apparatus, information of a virtual network which is used by the another virtual machine, and information of the physical port of the physical switch connected to the another virtual machine, determining whether or not the first virtual network which was uses by the first virtual machine is used by the another virtual machine which runs on the first information processing apparatus; and second transmitting an instruction to delete information relating to the first virtual network from the first information which is stored in the virtual network storing unit to the physical switch when the first virtual network is not used by the another virtual machine and the migration of the first virtual machine which is started at the migration is completed, wherein the first transmitting includes comparing, before the first virtual machine migrates to the second information processing apparatus, scheduled version of the second information which associates the information of the second physical port and the information of the virtual network on the assumption that the first virtual machine migrates to the second information processing apparatus with the second information which is stored in the virtual network storing unit before the first virtual machine migrates, determining whether or not the second physical port of the second information processing apparatus which is the migration destination of the first virtual machine and the information relating to the first virtual network is associated.

2. A non-transitory computer-readable recording medium having stored therein a program for causing a computer to execute a virtual network control process, the virtual network control process comprising:

migrating a first virtual machine that uses a first virtual network and runs on a first information processing apparatus to a second information processing apparatus connected to the first information processing apparatus using a physical switch;

referring to a virtual network storing unit of the physical switch, the virtual network storing unit storing first information that associates information of a first physical port of the physical switch connected to the first information processing apparatus and information of a virtual network including the first virtual network to which the first physical port belongs and second information that associates information of a second physical port of the physical switch connected to the second information processing apparatus and information of a virtual network including a second virtual network to which the second physical port belongs, when the second physical port connected to the second information processing apparatus which is a migration destination of the first virtual machine does not belong to the first virtual network, first transmitting, to the physical switch, an instruction to add information relating to the first virtual network to the second information which is stored in the virtual network storing unit during the migration of the first virtual machine which is started at the migration;

when the first virtual machine migrates to the second information processing apparatus, referring to the virtual network storing unit and an address storing unit of the physical switch which stores in association with information of another virtual machine running on the first information processing apparatus, information of a virtual network which is used by the another virtual machine, and information of the physical port of the physical switch connected to the another virtual machine, determining whether or not the first virtual network which was uses by the first virtual machine is used by the another virtual machine which runs on the first information processing apparatus; and second transmitting an instruction to delete information relating to the first virtual network from the first information which is stored in the virtual network storing unit to the physical switch when the first virtual network is not used by the another virtual machine and the migration of the first virtual machine which is started at the migration is completed, wherein the determining includes comparing, before the first virtual machine migrates to the second information processing apparatus, scheduled version of the first information which associates the information of the first physical port and the information of the virtual network on the assumption that the first virtual machine migrated to the second information processing apparatus with the information which is stored in the address storing unit of the physical switch, determining whether or not the first virtual network which was used by the first virtual machine and the information relating to the another virtual machine which runs on the first information processing apparatus is associated.

3. The non-transitory computer-readable recording medium according to claim 2, wherein the second transmitting includes storing ongoing information including information which specifies a third virtual machine to be transferred, information which specifies an information processing apparatus which is a migration destination of the third virtual machine, and information of a third virtual network which was used by the third virtual machine in association with each other in a predetermined storing unit, when the first information processing apparatus is the information processing apparatus which is the migration destination of the third virtual machine to be transferred, referring to the ongoing information, the virtual network storing unit, and the address storing unit, and transmitting the instruction to delete information relating to the first virtual network from the first information which is stored in the virtual network storing unit to the physical switch when the first virtual network does not conform with the information of the third virtual network.

4. The non-transitory computer-readable recording medium according to claim 1, wherein the second transmitting includes storing ongoing information including information which specifies a third virtual machine to be transferred, information which specifies an information processing apparatus which is a migration destination of the third virtual machine, and information of a third virtual network which was used by the third virtual machine in association with each other in a predetermined storing unit, when the first information processing apparatus is the information processing apparatus which is the migration destination of the third virtual machine to be transferred, referring to the ongoing information, the virtual network storing unit, and the address storing unit, and transmitting the instruction to delete information relating to the first virtual network from the first information which is stored in the virtual network storing unit to the physical switch when the first virtual network does not conform with the information of the third virtual network.

5. A virtual network control method comprising:

migrating a first virtual machine that uses a first virtual network and runs on a first information processing apparatus to a second information processing apparatus connected to the first information processing apparatus using a physical switch;

referring to a virtual network storing unit of the physical switch, the virtual network storing unit storing first information that associates information of a first physical port of the physical switch connected to the first information processing apparatus and information of a virtual network including the first virtual network to which the first physical port belongs and second information that associates information of a second physical port of the physical switch connected to the second information processing apparatus and information of a virtual network including a second virtual network to which the second physical port belongs, when the second physical port connected to the second information processing apparatus which is a migration destination of the first virtual machine does not belong to the first virtual network, first transmitting, to the physical switch, an instruction to add information relating to the first virtual network to the second information which is stored in the virtual network storing unit during the migration of the first virtual machine which is started at the migration;

when the first virtual machine migrates to the second information processing apparatus, referring to the virtual network storing unit and an address storing unit of the physical switch which stores in association with information of another virtual machine running on the first information processing apparatus, information of a virtual network which is used by the another virtual machine, and information of the physical port of the physical switch connected to the another virtual machine, determining whether or not the first virtual network which was uses by the first virtual machine is used by the another virtual machine which runs on the first information processing apparatus; and second transmitting an instruction to delete information relating to the first virtual network from the first information which is stored in the virtual network storing unit to the physical switch when the first virtual network is not used by the another virtual machine and the migration of the first virtual machine which is started at the migration is completed, wherein the first transmitting includes comparing, before the first virtual machine migrates to the second information processing apparatus, scheduled version of the second information which associates the information of the second physical port and the information of the virtual network on the assumption that the first virtual machine migrates to the second information processing apparatus with the second information which is stored in the virtual network storing unit before the first virtual machine migrates, determining whether or not the second physical port of the second information processing apparatus which is the migration destination of the first virtual machine and the information relating to the first virtual network is associated.

6. An information processing apparatus comprising:

a memory; and a processor coupled to the memory, wherein the processor executes a process comprising:

migrating a first virtual machine that uses a first virtual network and runs on a first information processing apparatus to a second information processing apparatus connected to the first information processing apparatus using a physical switch;

referring to a virtual network storing unit of the physical switch, the virtual network storing unit storing first information that associates information of a first physical port of the physical switch connected to the first information processing apparatus and information of a virtual network including the first virtual network to which the first physical port belongs and second information that associates information of a second physical port of the physical switch connected to the second information processing apparatus and information of a virtual network including a second virtual network to which the second physical port belongs, when the second physical port connected to the second information processing apparatus which is a migration destination of the first virtual machine does not belong to the first virtual network, first transmitting, to the physical switch, an instruction to add information relating to the first virtual network to the second information which is stored in the virtual network storing unit during the migration of the first virtual machine which is started at the migration;

when the first virtual machine migrates to the second information processing apparatus, referring to the virtual network storing unit and an address storing unit of the physical switch which stores in association with information of another virtual machine running on the first information processing apparatus, information of a virtual network which is used by the another virtual machine, and information of the physical port of the physical switch connected to the another virtual machine, determining whether or not the first virtual network which was uses by the first virtual machine is used by the another virtual machine which runs on the first information processing apparatus; and second transmitting an instruction to delete information relating to the first virtual network from the first information which is stored in the virtual network storing unit to the physical switch when the first virtual network is not used by the another virtual machine and the migration of the first virtual machine which is started at the migration is completed, wherein the first transmitting includes comparing, before the first virtual machine migrates to the second information processing apparatus, scheduled version of the second information which associates the information of the second physical port and the information of the virtual network on the assumption that the first virtual machine migrates to the second information processing apparatus with the second information which is stored in the virtual network storing unit before the first virtual machine migrates, determining whether or not the second physical port of the second information processing apparatus which is the migration destination of the first virtual machine and the information relating to the first virtual network is associated.

* * * * *